(12) United States Patent
Yoshida et al.

(10) Patent No.: US 7,342,605 B2
(45) Date of Patent: Mar. 11, 2008

(54) DIGITAL CAMERA HAVING AN ALL-FRAME PRINT NUMBER SETTING DEVICE TO COLLECTIVELY SET ALL RECORDED FRAMES FOR PRINTING

(75) Inventors: Masanori Yoshida, Asaka (JP); Hiroshi Tanaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 620 days.

(21) Appl. No.: 10/781,875

(22) Filed: Feb. 20, 2004

(65) Prior Publication Data

US 2004/0165070 A1    Aug. 26, 2004

Related U.S. Application Data

(62) Division of application No. 09/497,120, filed on Feb. 3, 2000, now Pat. No. 6,850,273.

(30) Foreign Application Priority Data

Feb. 3, 1999    (JP)    ............... 11-026605

(51) Int. Cl.
  *H04N 5/76*    (2006.01)
  *H04N 5/225*   (2006.01)
(52) U.S. Cl. ............... 348/231.3; 348/207.2
(58) Field of Classification Search ........ 348/207.2, 348/231.99, 231.2, 231.3, 231.6; 396/310, 396/311, 319–321; 705/26
See application file for complete search history.

(56) References Cited

U.S. PATENT DOCUMENTS

| | | | |
|---|---|---|---|
| 6,198,526 B1 * | 3/2001 | Ohtsuka | 355/40 |
| 6,249,316 B1 * | 6/2001 | Anderson | 348/333.05 |
| 6,549,307 B1 | 4/2003 | Makishima et al. | |
| 6,563,542 B1 * | 5/2003 | Hatakenaka et al. | 348/333.02 |
| 6,573,927 B2 * | 6/2003 | Parulski et al. | 348/32 |
| 6,618,168 B1 * | 9/2003 | Nakajima et al. | 358/1.16 |
| 6,686,964 B1 * | 2/2004 | Makishima et al. | 348/333.02 |
| 6,771,896 B2 * | 8/2004 | Tamura et al. | 396/57 |
| 6,784,925 B1 * | 8/2004 | Tomat et al. | 348/207.11 |

FOREIGN PATENT DOCUMENTS

| | | | |
|---|---|---|---|
| JP | 4-185063 A | 7/1992 | |
| JP | 5-328122 A | 12/1993 | |
| JP | 8-228311 A | 9/1996 | |
| JP | 9-244148 A | 9/1997 | |
| JP | 10-75393 A | 3/1998 | |
| JP | 10-301192 A | 11/1998 | |
| JP | 10-304292 A | 11/1998 | |
| JP | 10-340174 A | 12/1998 | |
| JP | 11-4376 A | 1/1999 | |

* cited by examiner

*Primary Examiner*—Tuan Ho
*Assistant Examiner*—Timothy J Henn
(74) *Attorney, Agent, or Firm*—Birch, Stewart, Kolasch & Birch, LLP

(57) ABSTRACT

An image file imaged by a digital camera is stored in a memory card, and the digital camera sets the number of prints for each image file according to the digital print order format (DPOF) standard and records the number as a printing information file in the memory card. When the number of prints is set, an image file in which at least one frame is designated for printing is determined to have a read-only file property in order to prevent the image file from being erased against the designation for printing. There is provided a mode for collectively designating all frames for printing.

5 Claims, 17 Drawing Sheets

F I G. 5
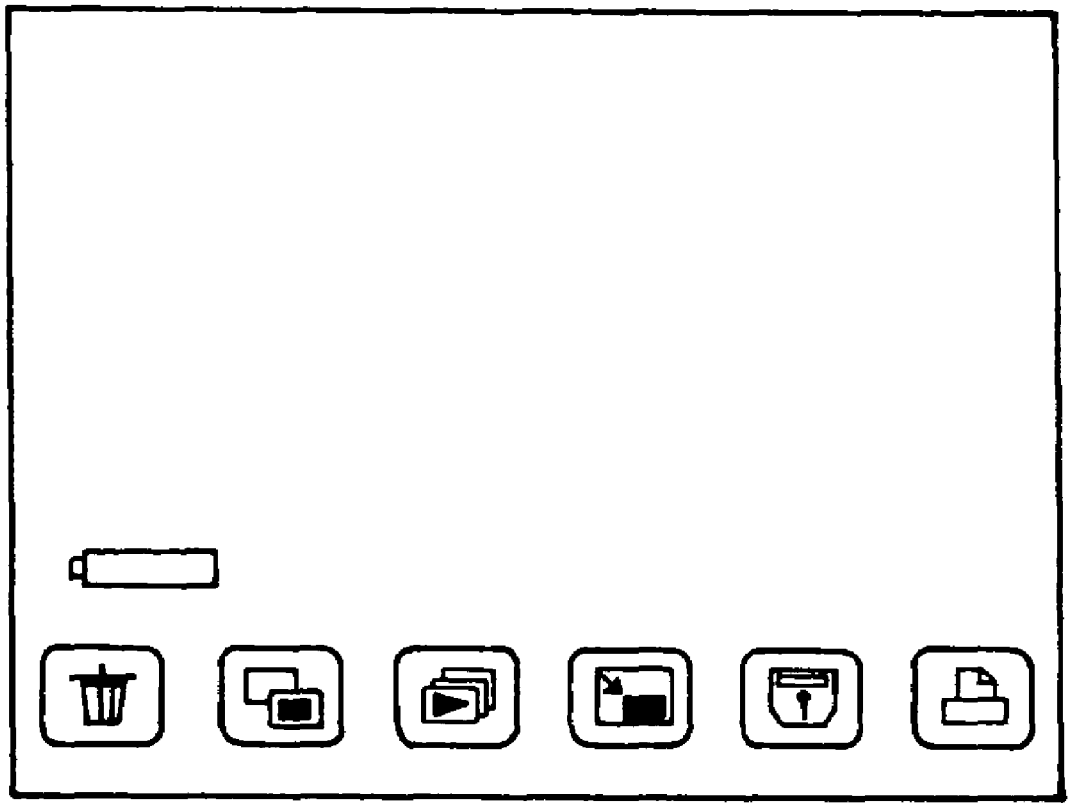

F I G. 8(A)
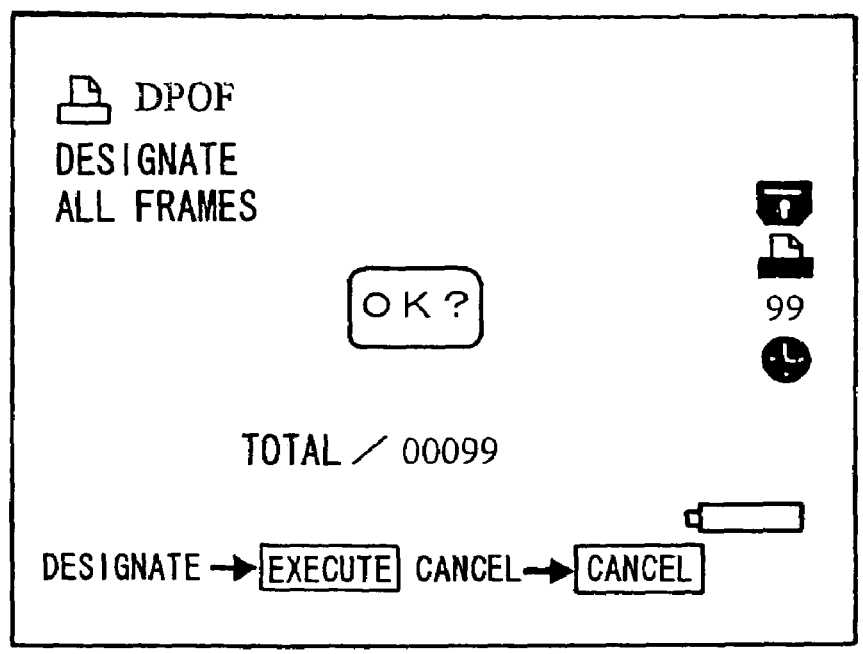
F I G. 8(B)
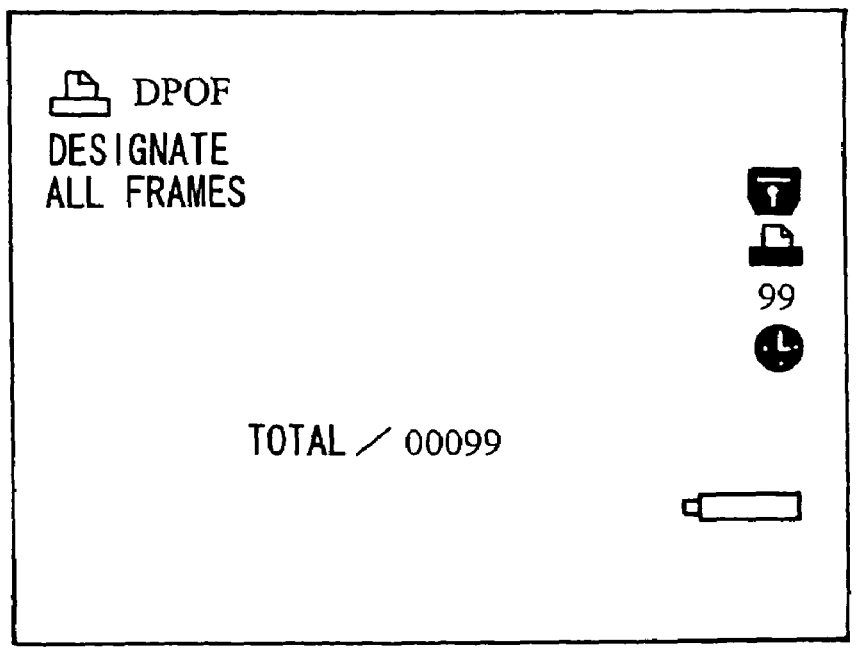

F I G. 1 2 (A)
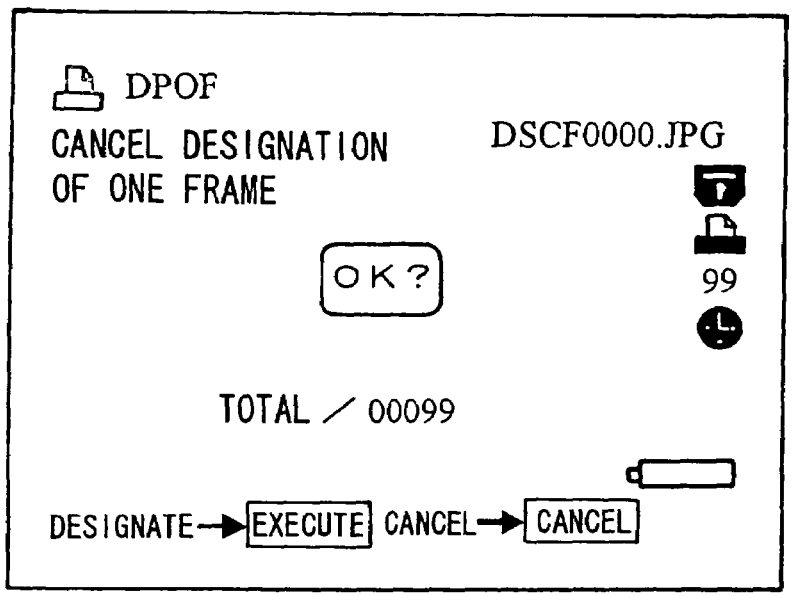
F I G. 1 2 (B)
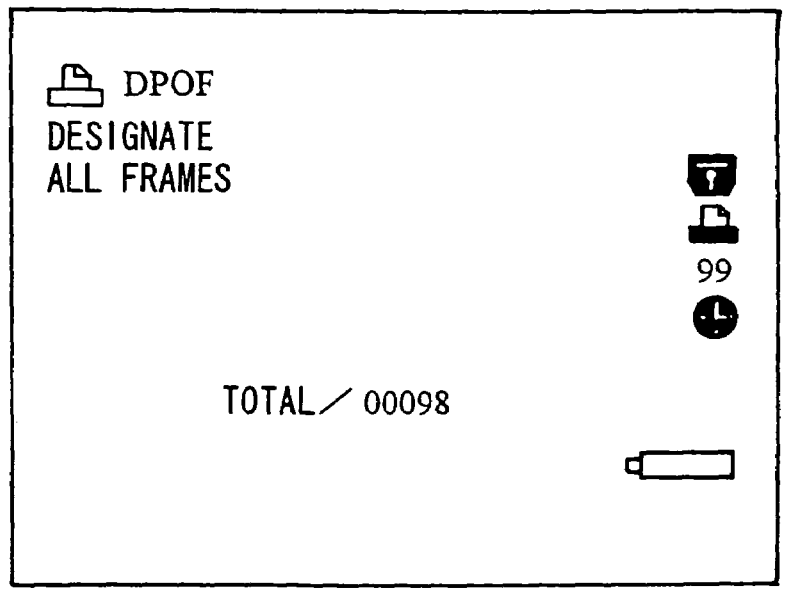

F I G. 1 3 (A)
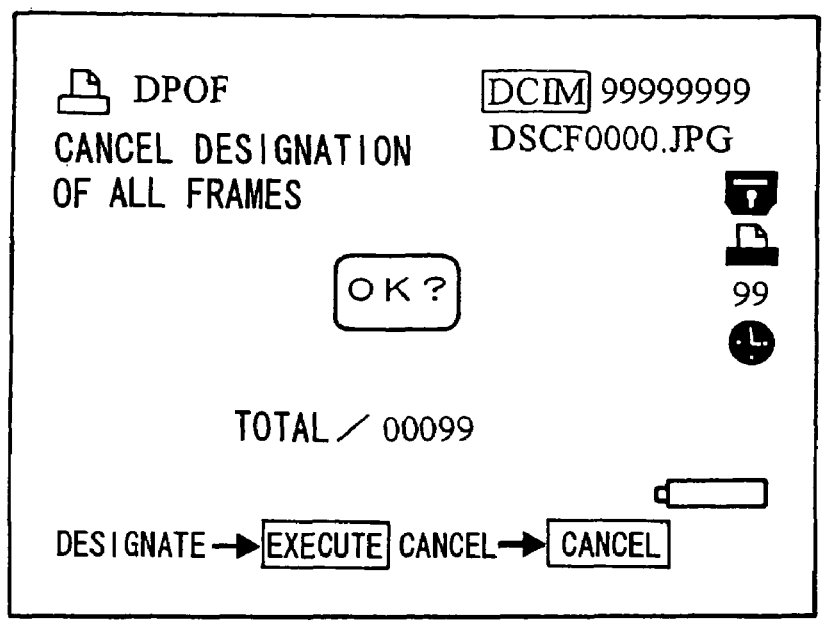
F I G. 1 3 (B)
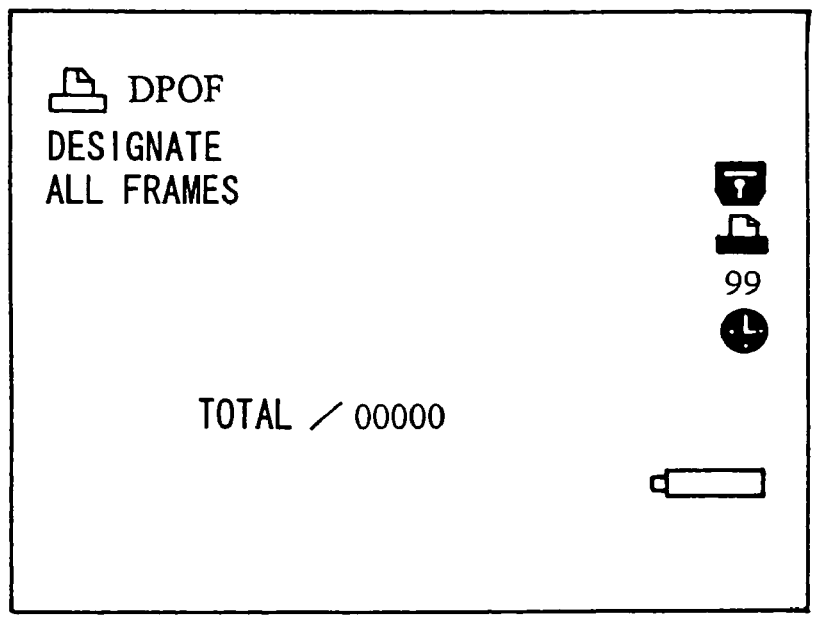

F I G. 1 4 (A)
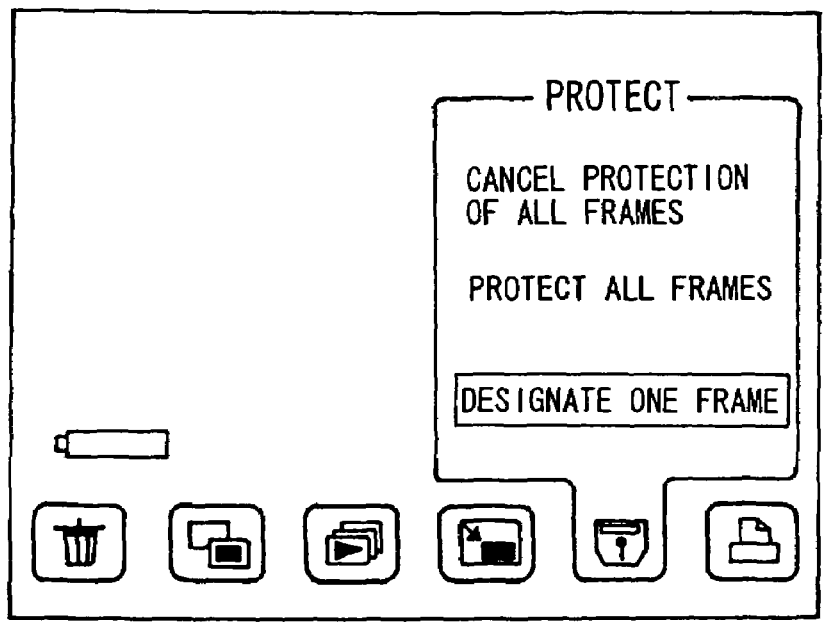
F I G. 1 4 (B)
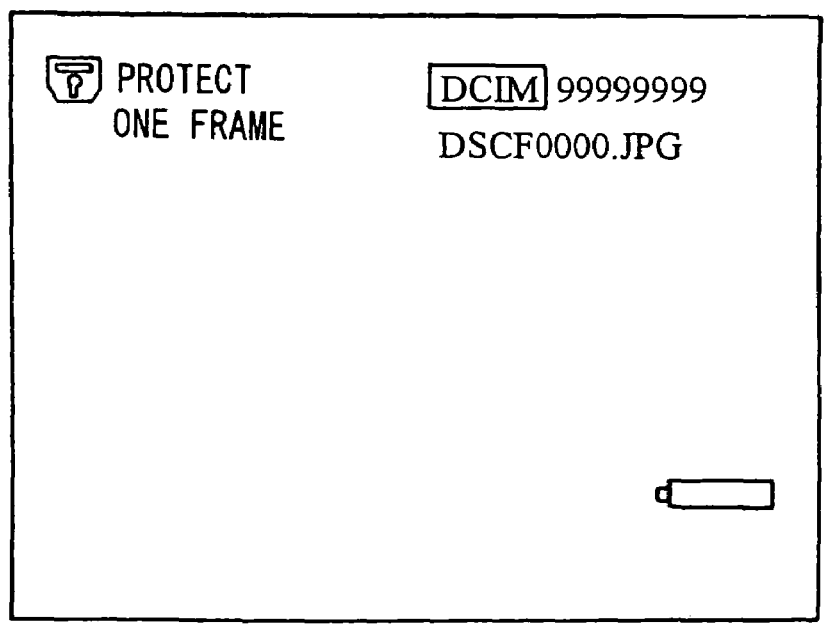

F I G. 1 7
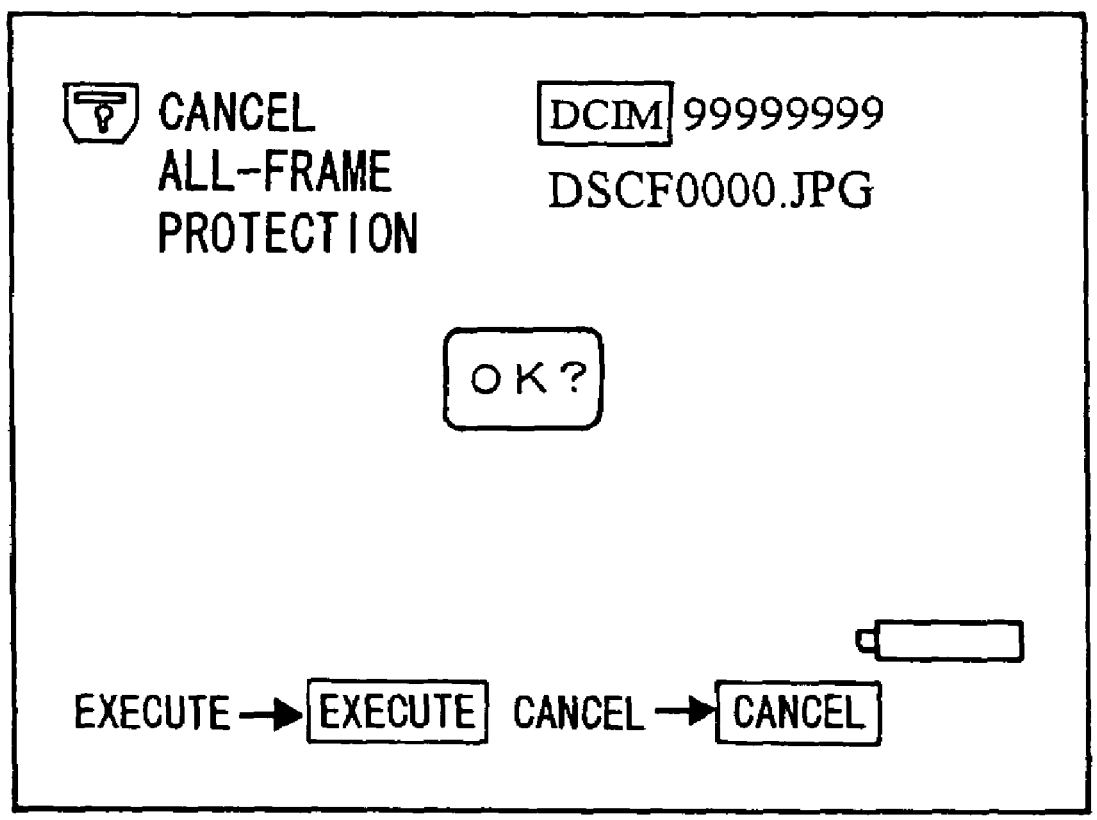

DIGITAL CAMERA HAVING AN ALL-FRAME PRINT NUMBER SETTING DEVICE TO COLLECTIVELY SET ALL RECORDED FRAMES FOR PRINTING

This application is a Divisional of co-pending application Ser. No. 09/497,120, filed on Feb. 3, 2000 now U.S. Pat. No. 6,850,273, the entire contents of which are hereby incorporated by reference and for which priority is claimed under 35 U.S.C. § 120; and this application claims priority of application Ser. No. 11-026605 filed in Japan on Feb. 3, 1999 under 35 U.S.C. § 119.

BACKGROUND OF THE INVENTION

1. Field of the Invention

This invention relates to a digital camera. More particularly, this invention relates to a digital camera that is capable of producing and recording printing information, e.g., numbers of prints to be produced, of photographed images.

2. Description of Related Art

Currently, a digital image photographed by a digital camera is generally recorded in a recording medium (a removable medium) such as a detachable memory card and a magnetic disk. The image recorded in the recording medium is not only displayed on a monitor but also printed with a personal printer for domestic use or the like. In recent years, the image can be printed at a laboratory in response to an order in the same way as that on a film.

In the future, the images are expected to be printed more with the personal printer and at the laboratory with the spread of digital cameras. Accordingly, a standard called the digital print order format (DPOF) has been made public recently.

According to the DPOF standard, electronic printing information such as the number of prints and trimming is produced and is stored together with image files in the recording medium. Recording formats for recording the image files and the printing information are standardized. In particular, a file (which is called a DPOF file but will hereafter be referred to as a printing information file) for containing the printing information is written in a text file format, and is recorded in the recording medium independently of the image file.

The storage of the printing information and the image files in the recording medium by the digital camera or a related equipment according to the DPOF standard eliminates the necessity of determining numbers of prints to be produced from which images, how the images are trimmed for printing, and the like when the images are printed with the personal printer or at the order to the laboratory for printing. Even if the printer does not have an image regenerating function, desired numbers of prints can be produced from desired images. Moreover, there is no necessity of providing the printer with the image regenerating function.

According to the DPOF standard, the printing information is not added to the image files but is recorded in the text file format as printing information files independently of the image files. This enables the erasure of the image files and the printing information files independently of one another. If the image files are erased freely, the image files may be erased carelessly. In this case, there is such a possibility that the image file designated for printing (which is designated for producing one or more prints) in the printing information does not exist.

To solve this problem, it can be considered that the printing information is corrected at the same time as the erasure of the image file. In this method, however, it is necessary to confirm and correct the printing information every time the image file is erased, and this makes the process of the digital camera difficult and decreases the processing speed of the digital camera.

In another method, whether the image file is designated for printing or not is written in tag information of the image file, and the image file is erased with reference to the tag information without referring to the printing information. This method, however, is ineffective for a camera that has no rules of the use of the tag information. Moreover, the image files as well as the printing information files include the printing information, and the information in the recording medium is redundant.

If the frames are designated for printing only on a frame-by-frame basis in the case where the digital camera has the function of designating frames for printing as described above, it is complicated to designate all frames for printing. Since many users would like one print from each of all frames as is the case with prints with photographic film processing, the users of the digital camera needs to have one print from each of all frames easily as is the case with the prints with photographic film processing.

SUMMARY OF THE INVENTION

It is therefore an object of the present invention to provide a digital camera, which properly prevents the erasure of an image file designated for printing and properly designates frames for printing without reducing the convenience of the DPOF standard.

To achieve the above object, the present invention provides a digital camera which records images of frames captured by an imaging device as image files in a recording medium, said digital camera comprising: a printing information producing device that produces printing information for each frame, referred to when said images recorded in said recording medium are printed; a printing information recording device that records said printing information of each frame, produced by said printing information producing device, as one printing information file in said recording medium; and a property changing device that changes properties of image files of frames designated for printing for which at least one print is designated, from normal file properties in which images can be erased and changed, to read-only file properties in which images can be only read.

According to the present invention, the properties of the image files of the frames designated for printing is automatically changed to the read-only file properties, and this surely prevents the careless erasure of the image files designated for printing.

The present invention also provides a digital camera that records an image of each frame captured by an imaging device and information of number of prints to be produced from each frame in a recording medium, said information being referred to when said image is printed, that has a display to display said image, and that has regenerating function of displaying only images for which at least one print is designated to be produced in accordance with said information relating of the number of prints on said display.

According to the present invention, the images of the frames designated for printing can be confirmed quickly.

The present invention also provides a digital camera which records an image of each frame captured by an imaging device and information of number of prints to be produced from each frame in a recording medium, said information being referred to when said image is printed, said digital camera comprising: an all-frame print number setting device that collectively sets the numbers of prints for the images of all the frames recorded in said recording medium.

According to the present invention, all the frames are easily designated for printing, and the user can have one print from each of all frames easily as is the case with the prints with photographic film processing.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a view showing a regeneration menu picture;

FIGS. 8(A) and 8(B) are views showing a print number setting picture in all-frame printing designation, and a confirmation picture after the number of prints is fixed, respectively;

FIG. 12(A) is a view showing a picture displayed in the case that the designation for printing is confirmed/canceled, and FIG. 12(B) is a view showing a confirmation picture after the designation for printing is canceled;

FIG. 13(A) is a view showing a picture displayed in an all-frame printing designation cancel mode and FIG. 13(B) is a view showing a confirmation picture after designation of all the frames for printing is cancelled;

FIG. 14(A) is a view showing a protect menu picture and FIG. 14(B) is a view showing a confirmation picture after one frame is designated for protection;

FIG. 17 is a view showing a confirmation picture after designation of all the frames for protection is cancelled.

DETAILED DESCRIPTION OF THE PREFERRED EMBODIMENT

This invention will be described in further detail by way of example with reference to the accompanying drawings.

Figure 1:
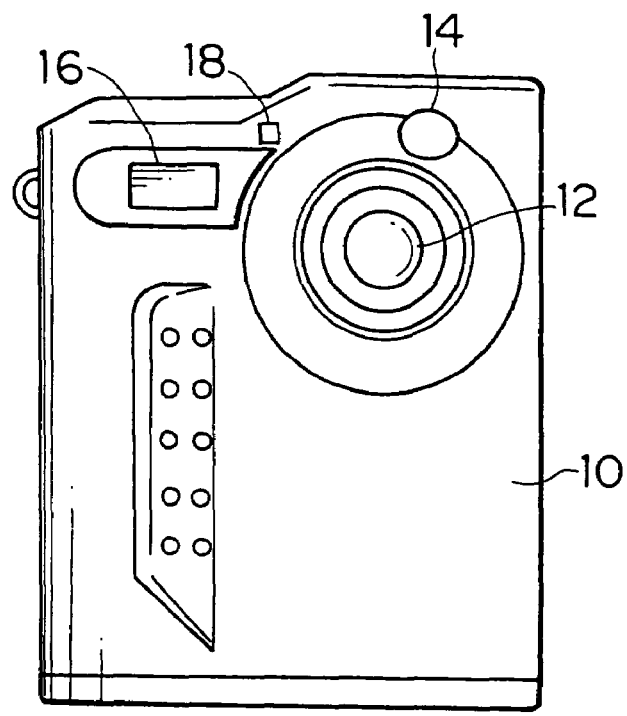
FIG. 1 is a front view showing the exterior of a digital camera according to the present invention.
Figure 2:
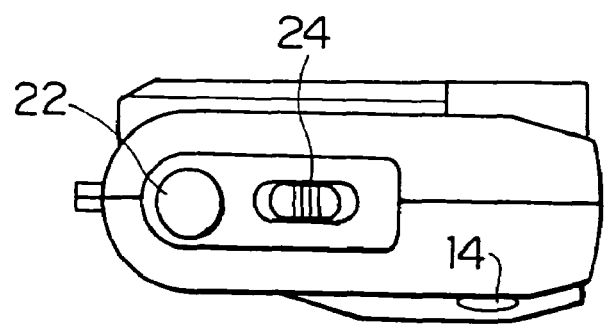
FIG. 2 is a plan view showing the exterior of the digital camera according to the present invention.
Figure 3:
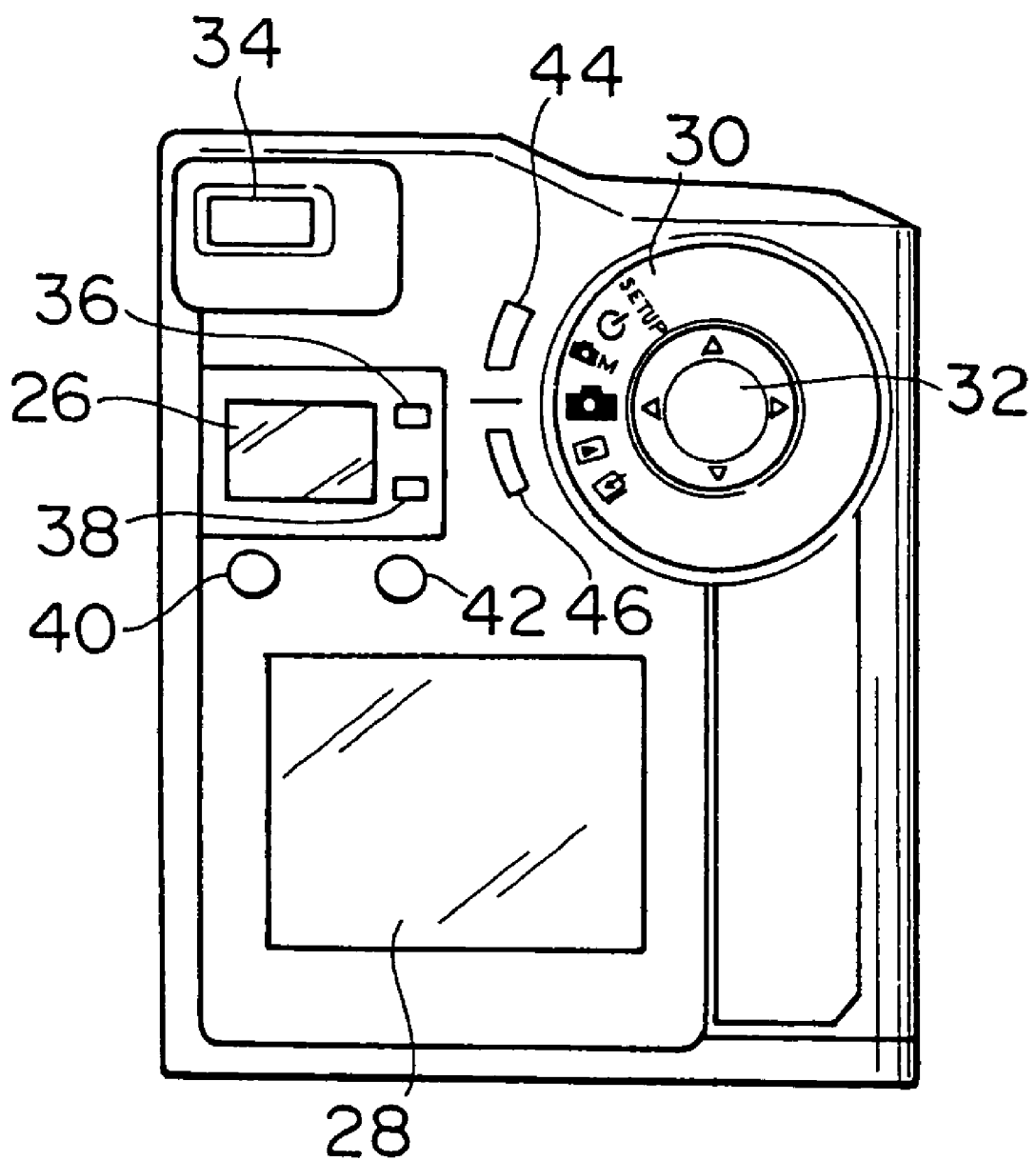
FIG. 3 is a back view showing the exterior of the digital camera according to the present invention.

FIGS. 1-3 are a front view, a plan view and a back view, respectively, showing the exterior of a digital camera 10 according to the present invention. As shown in FIG. 1, a taking lens 12, a finder window 14, a strobe 16, a strobe light control sensor 18 are provided at the front of the digital camera 10. A CCD (an imaging device) is arranged behind the taking lens 12.

As shown in FIG. 2, a shutter release button 22 and a power switch 24 are provided at the top of the digital camera 10. The shutter release button 22 is half and fully pressed. When the shutter release button 22 is half pressed, an automatic focusing (AF) function and an automatic exposure control (AE) function operate to lock a focus and an exposure. The photographing is executed when the shutter release button 22 is fully pressed.

As shown in FIG. 3, a character display liquid crystal display (LCD) panel 26, an LCD monitor 28, a mode switch 30, a cross cursor button (up, down, left and right keys) 32, a finder 34 and the like are provided at the back of the digital camera 10.

The character display LCD panel 26 displays information relating to the state of the camera, photographing modes and the like. For example, the character display LCD panel 26 displays the residual amount of a battery, the number of frames that may be exposed, a frame number of a regenerated image, whether the strobe should be flashed or not, a macro mode, the quality of a recorded image, and the number of pixels.

A strobe button 36 and a macro button 38 are arranged at the side of the character display LCD panel 26. The strobe button 36 is operated in order to flash the strobe and prohibit the flash of the strobe according to photographic circumstances. The macro button 38 is operated to set a close-range (macro) photographing mode.

The LCD monitor 28 displays images photographed through the CCD, regenerated images read from a memory card (a smart medium) mounted in the camera. The LCD monitor 28 is used to set printing information which will be described later. A shift button 40, a display button 42, a cancel button 44 and a menu/execution button 46 are arranged above the LCD monitor 28.

The mode switch 30 and the cross cursor button 32 are composed of a central button member and a ring member arranged at the circumference thereof. The mode switch 30 is capable of rotating clockwise and counterclockwise.

The mode switch 30 is used to change the functions (modes) of the camera, and the rotation of the mode switch 30 selects the mode; e.g., a photographing mode for performing the photographing and a regeneration mode for regenerating the photographed image and setting a variety of matters.

The cross cursor button 32 is tilted by pressing the top, bottom, right or left edge thereof to enter an command corresponding to one of four direction (up, down, right and left). The cross cursor button 32 is used as a control button to select and change an item from a variety of setting items such as the modes, and is used as a means for giving instructions to adjust the magnification of an electric zoom, move the center of zooming and regenerate the last or next image.

Although not illustrated in the drawings, a holder in which the memory card is mounted is provided at one side of the digital camera 10. For example, the smart medium is used as the memory card. A PC card, a flash memory card, an IC card, a floppy disk, a magneto-optical (MO) disk, and the like may also be used as the recording medium.

The memory card contains the images photographed by the CCD. According to the DPOF (digital print order format) standard, the digital camera 10 records the image data of each frame photographed by the CCD as an image file and records printing information relating to each frame image as a printing information file (a DPOF file). The image recorded in the memory card is printed with reference to the printing information. The printing information is, for example, the number of prints to be produced and the trimming of the image. The printing information relating to each frame is written in a text file format in one printing information file. In the present embodiment, the number of prints can be set as the printing information.

Figure 4:
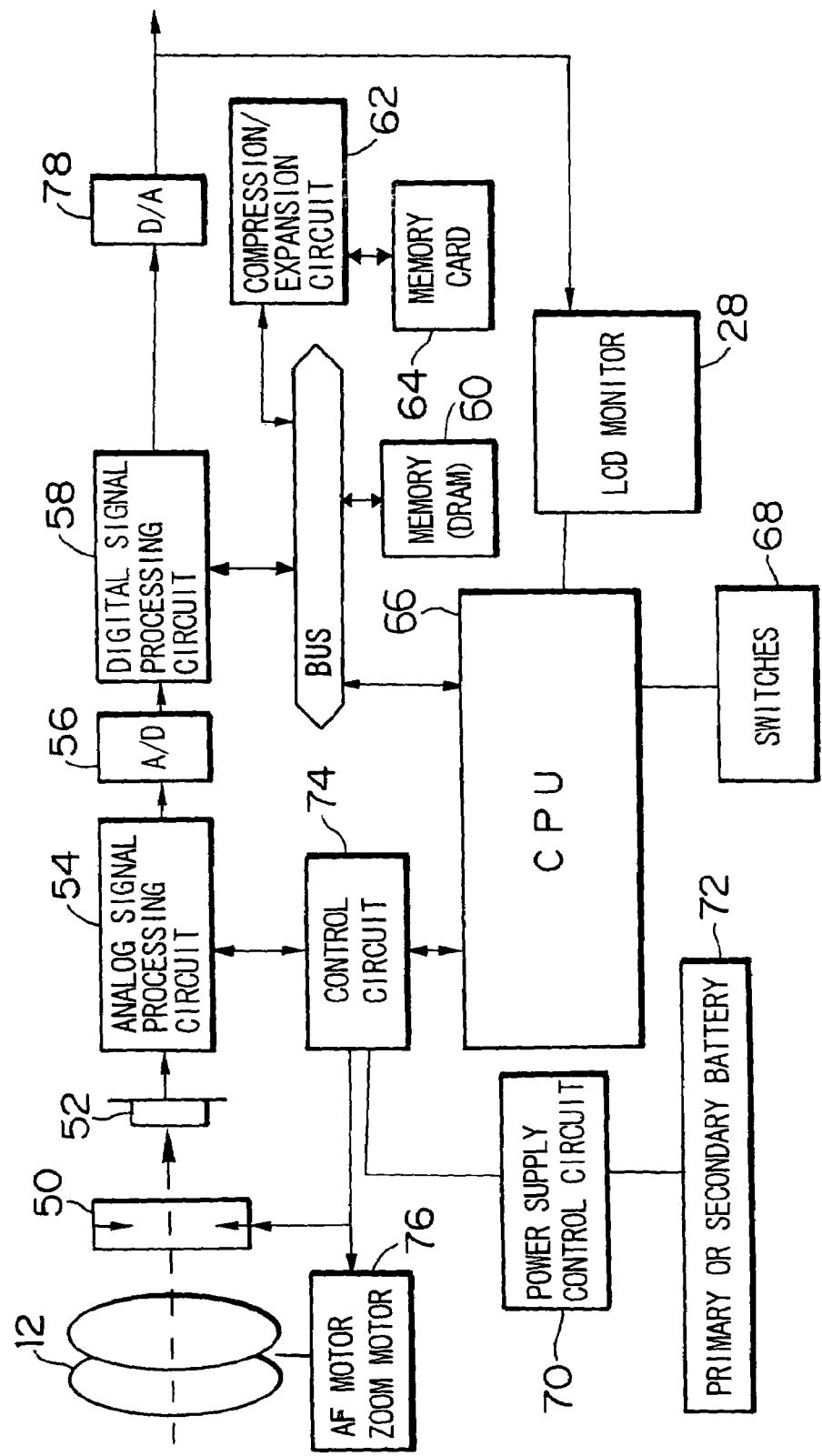
FIG. 4 is a block diagram showing the structure of the digital camera according to the present invention.

FIG. 4 is a block diagram showing the structure of the digital camera 10. The digital camera 10 is comprised mainly of the taking lens 12, a diaphragm 50, the solid state imaging device (the CCD) 52, an analog signal processing circuit 54, a digital signal processing circuit 58, a memory (DRAM) 60, a compression/expansion circuit 62, the memory card 64, the LCD monitor 28 and a central processing unit (CPU) 66.

The CPU 66 controls the circuits according to signals from switches 68 such as the shutter release button 22, the mode switch 30 and the cross cursor button 32. When the power switch 24 is turned on, the CPU 66 gives a command to a power supply control circuit 70 to supply power to each part of the camera from a primary or secondary battery 72 through the power supply control circuit 70 in order to activate each circuit.

When the photographing mode is set by operating the mode switch 30 and then the shutter release button 22 is pressed, the CPU 66 detects this and gives a command to a control circuit 74. The control circuit 74 controls the focus by driving a taking lens driving part 76 with the power supplied from the power supply control circuit 70, and controls the exposure by controlling electronic charge accumulation times in the diaphragm 50 and the CCD 52. The taking lens 12 can be zoomed in response to a zooming command.

A light of a subject enters a light receiving surface of the CCD 52 through the taking lens 12 and the diaphragm 50, and is converted into a signal electronic charge corresponding to the quantity of light entering each sensor of the CCD 52. The signal electronic charges are sequentially read as corresponding voltage signals (image signals) according to clock pulses. The image signals are outputted from the CCD 52 to the analog signal processing circuit 54. The analog signal processing circuit 54 has a CDS clamp, a gain control amplifier, and the like, and performs sampling, white balance adjustment, etc. of the image signals. The image signals processed by the analog signal processing circuit 54 are converted into R, G, B digital signals by an A/D converter 56, and are supplied to the digital signal processing circuit 58.

The digital signal processing circuit 58 includes a gamma correction circuit, a YC signal producing circuit and the like, and gamma-corrects and converts the R, G, B digital signals into a YC signal (a luminance signal Y and a chroma signal C). The YC signal is stored in the memory 60 through a bus. The YC signal stored in the memory 60 is inputted to the compression/expansion circuit 62 through the bus to be compressed in a predetermined format at the compression/expansion circuit 62, and then is recorded in the memory card 64, which may be attached to and detached from the camera. The memory card 54 contains the image data of each frame as an image file.

The YC signal generated in the digital signal processing circuit 58 is outputted from a video output terminal to the outside through a D/A converter 78, and is outputted to the LCD monitor 28 arranged at the back of the digital camera 10. Consequently, the image photographed by the CCD 52 is displayed on the LCD monitor 28 in the photographing mode. In the regeneration mode, the compression/expansion circuit 62 extracts the image recorded in the memory card 64, and the image is outputted to the LCD monitor 28. The regenerated image is displayed on the LCD monitor 28.

A description will now be given of the procedure in the case where the regeneration mode is set by operating the mode switch 30. In the digital camera 10, the number of prints to be produced is set as the printing information for the image file of each frame recorded in the memory card 64, and the printing information as well as the image files can be recorded in the memory card 64. The printing information (e.g., the number of prints) is produced according to the above-mentioned DPOF standard, and the printing information relating to each frame is written in the text file format in one printing information file independently from the image file. A description will now be given of the procedure for producing the printing information.

Figure 6A:
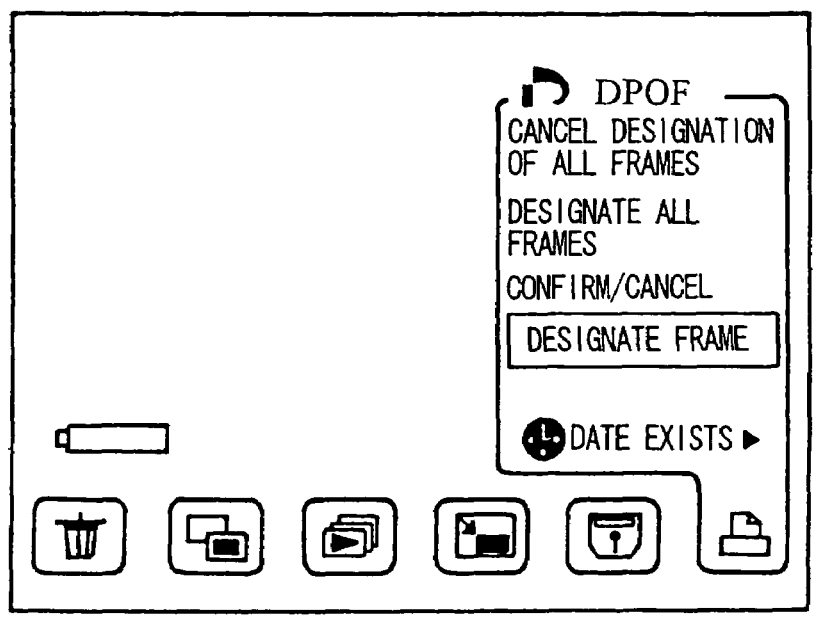
FIGS. 6(A), 6(B), 6(C) and 6(D) are views showing a print menu picture, a print number setting picture in one-frame printing designation, a print number setting picture after the number of prints is changed, and a confirmation picture after the number of prints is fixed, respectively.

When the regeneration mode is set by operating the mode switch 30, the regenerated image of the finally exposed frame is displayed on the LCD monitor 28. If the menu/execution button 46 (hereinafter referred to as an execution button 46) is pressed in this state, a regeneration menu picture is displayed over the regenerated image on the LCD monitor 28 as shown in FIG. 5. FIG. 5 does not describe the display of the regenerated image (this applies to the following description). Icons representing menus are displayed in the lower section of the regeneration menu picture. If the cursor is set at the icon at the right end by operating the cross cursor button 32 and then the execution button 46 is pressed, a printing designation mode is set. Therefore, a print menu picture is displayed as shown in FIG. 6(A).

The print menu picture displays-printing designation related items such as "designate frame", "confirm/cancel", "designate all frames" and "cancel designation of all frames". A printing designation related mode is set by selecting one printing designation related item by operating the cross cursor button 32.

Figure 6B:
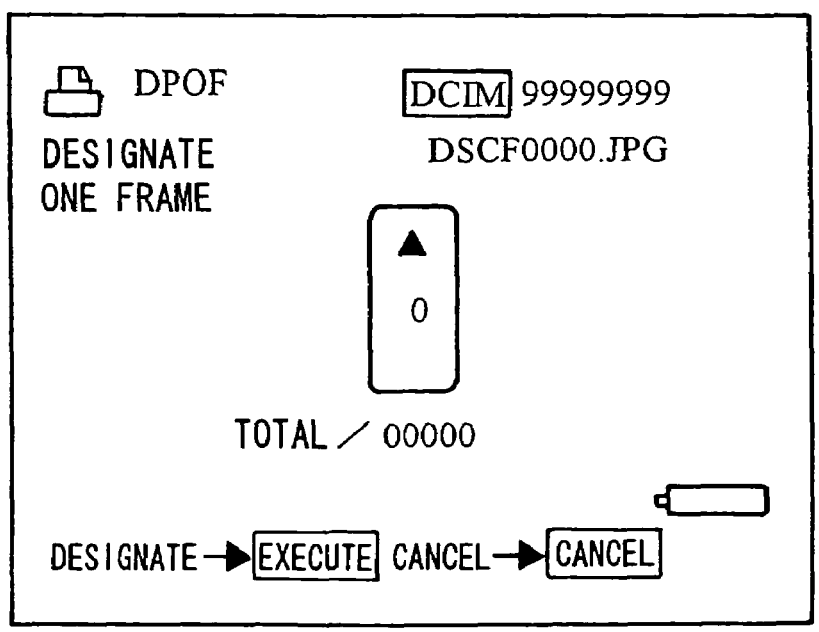
Figure 6C:
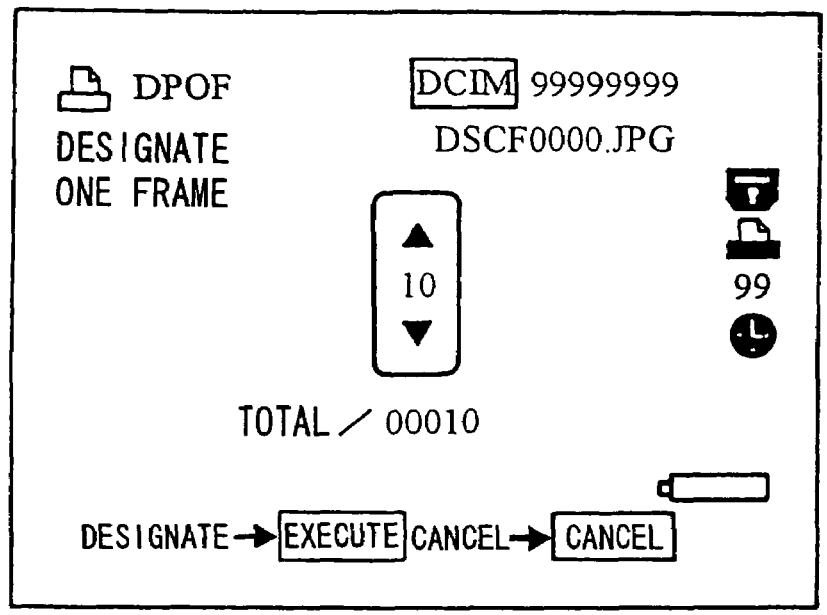

A description will now be given of the case where the "designate frame" is selected. If the "designate frame" is selected, a one-frame designation mode is selected. In this mode, the regenerated frame is designated for printing and the number of prints is designated on the LCD monitor 28. A print number setting picture in FIG. 6(B) appears over the image of the regenerated frame on the LCD monitor 28. A number in a rectangular frame displayed in the center of the picture represents the number of prints to be produced from the frame regenerated on the LCD monitor 28. The number of prints can be increased or decreased by operating the up or down key of the cross cursor button 32. If the number of prints is set to 0, the printing designation is cancelled. If the number of prints is set to 1 or more, the number of prints is designated (see FIG. 6(C)). If the execution button 46 is pressed after the number of prints is set, the number of prints for the frame being regenerated is fixed. After a confirmation picture in FIG. 6(D) appears for several seconds, the print menu picture in FIG. 6(A) appears again.

On the other hand, if the cancel button 44 is pressed before the number of prints is fixed, the setting on the print number setting picture is cancelled. The print menu picture in FIG. 6(A) appears again with the previously-set number of prints maintained.

The frames to be regenerated on the LCD monitor 28 can be changed by operating the left or right key of the cross cursor button 32. Each frame can be designated for printing by changing the frames to be regenerated and executing the above-described processing. Pressing the display button 42 switches the display on the LCD monitor 28 between a one-frame display and a multiple-frame display showing multiple frames collectively. In the multiple-frame display, a frame to be designated for printing is selected by operating the cross cursor button 32. The selected frame can be easily distinguished from the other frames since it is enclosed by, for example, a bold frame.

When the number of prints to be produced from the regenerated frame image is fixed, the CPU 66 adds the designation of the regenerated frame image for printing and the number of prints to the printing information file, and records the printing information file in the memory card 64.

The CPU 66 also automatically changes an image file of a frame whose number of prints to be generated is 1 or more, that is a frame that is designated for printing, to a read-only file which is prohibited from being erased or changed. This prevents the erasure of the image file of the frame designated for printing. The property of each image file is recorded in a predetermined management area in the memory card 64. The image file can be erased by selecting an icon at the left end of the regeneration menu picture in FIG. 5.

Figure 7:
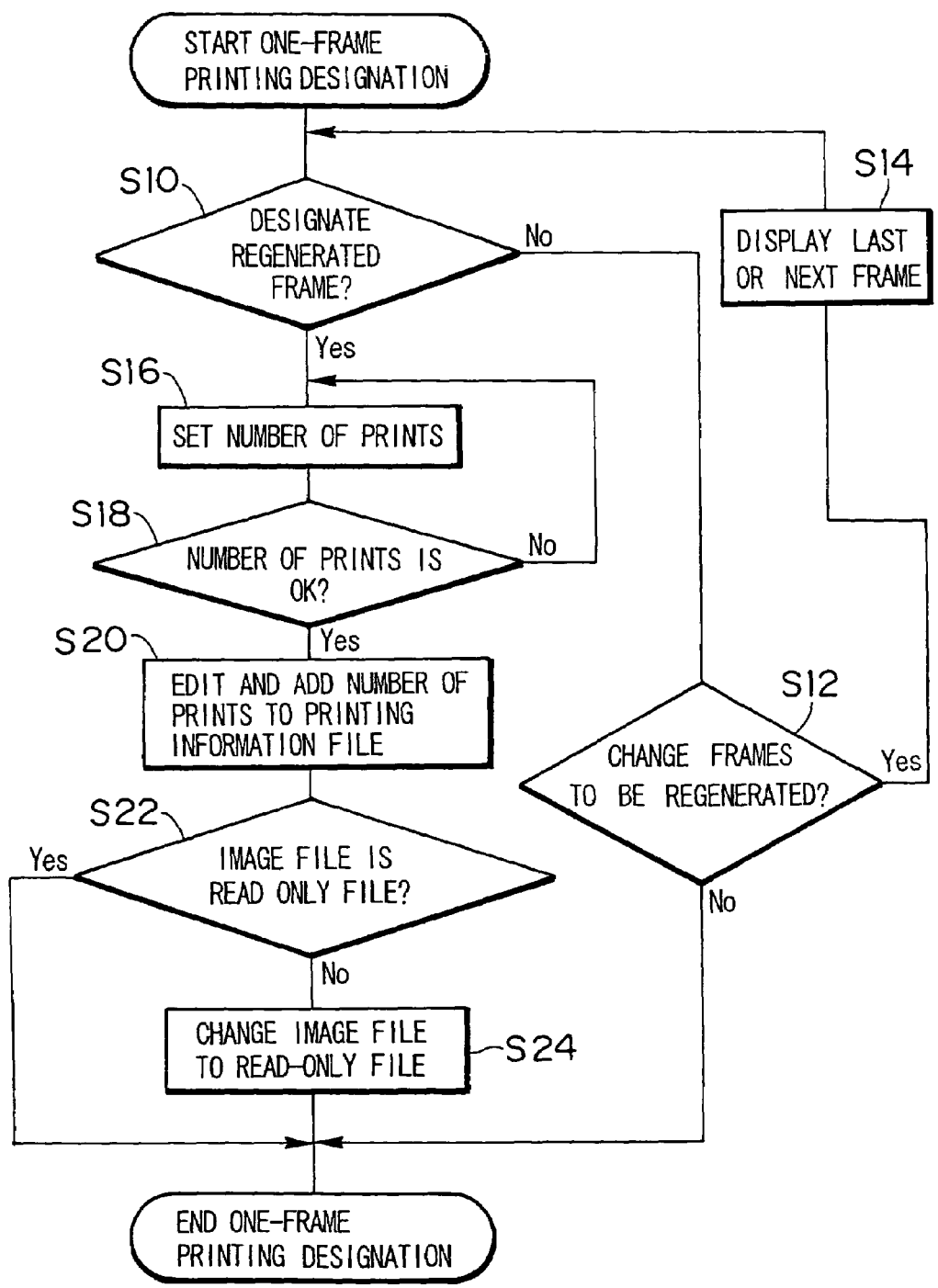
FIG. 7 is a flow chart showing the procedure in the one-frame printing designation.

FIG. 7 is a flow chart showing the process of the one-frame printing designation. If the "designate frame" is selected on the print menu picture in FIG. 6(A) and the one-frame printing designation is started, the CPU 66 displays the print number selection picture in FIG. 6(B) on the LCD monitor 28. A user decides whether to designate the regenerated frame for printing with reference to the frame image currently regenerated on the LCD monitor 28 (step S10). If NO, the user decides whether to change frames to be regenerated (step S12). If NO, in other words, if no frame is designated for printing, the cancel button 44 is pressed to finish the one-frame printing designation.

On the other hand, if YES at the step S12, in other words, if frames to be regenerated are changed, the last or next frame image is displayed by operating the left or right key of the cross cursor button 32 (step S14). Then, the process in the steps S10-S14 is repeated to display a regenerated frame of a desired frame on the LCD monitor 28.

If YES at the step S10, the number of prints is increased or decreased to set the number of prints to be produced from the regenerated frame image by operating the up or down key of the cross cursor button 32 (step S16). Then, it is determined whether the set number of prints is a desired one or not (step S18). If NO, the process at the steps S16 and S18 is repeated until the number of prints reaches the desired number. If the desired number is reached, the user fixes the number of prints by pressing the execution button 46, If the number of prints to be produced from the regenerated frame image is fixed, the CPU 66 adds the fixed number of prints in the printing information file and records the printing information file in the memory card 64 (step S20).

The CPU 66 confirms the property of the image file of the frame designated for printing according to the property data in the management area in the memory card 64 (step S22). If the image file can be erased and changed (the property of a normal file), the image file is changed to an image file that is prohibited to be erased and changed, that is a read-only file (step S24). If the image file is originally a read-only file, the property of the image file is unchanged. In a later-described protect mode, the user can change the file property under fixed conditions.

Figure 6D:
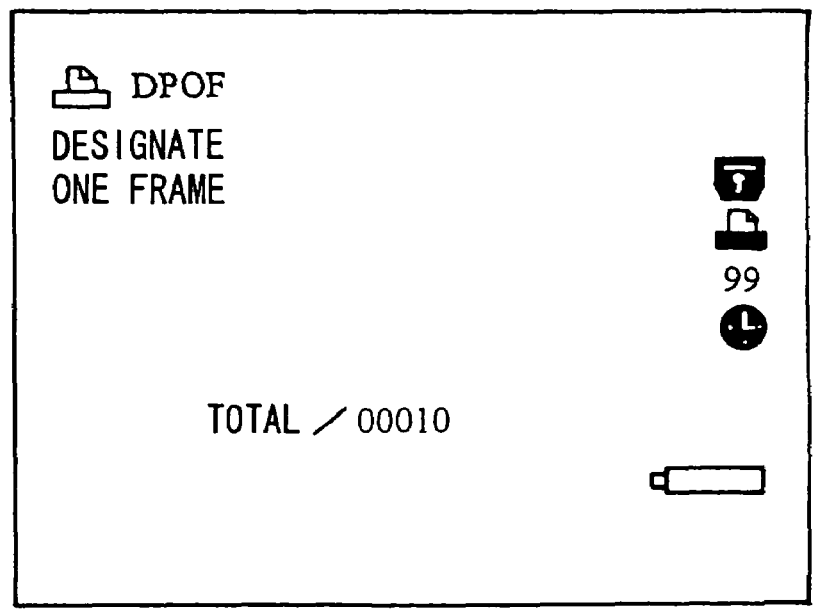

If the above procedure is completed, the CPU 66 displays the print menu picture in FIG. 6(A) after displaying the confirmation picture in FIG. 6(D) for several seconds on the LCD monitor 28. That completes the one-frame printing designation.

A description will now be given of the case where the "designate all frames" is selected on the print menu picture in FIG. 6(A). If the "designate all frames" is selected, an all-frame printing designation is set. In the all-frame printing designation, one print is designated for each of all the frames in the memory card 64. Therefore, the user can easily have one print from each of all frames as is the case with the prints with photographic film processing.

If the all-frame printing designation is set, the LCD monitor 28 displays a setting picture as shown in FIG. 8(A). Whether the all-frame printing designation is fixed or cancelled is only set on the setting picture. When the execution button 46 is pressed on the setting picture, the all-frame printing designation is fixed and a confirmation picture in FIG. 8(B) is displayed for several seconds. Then, the print menu picture in FIG. 6(A) is displayed again. On the other hand, when the cancel button 44 is pressed on the setting picture in FIG. 8(A), the all-frame printing designation is cancelled.

If the all-frame printing designation is fixed, the CPU 66 cancels the number of prints for each frame currently recorded in the printing information file, and adds a one-print designation for each frame image to each printing information file. Then, the printing information files are recorded in the memory card 64. The CPU 66 changes the image files of all the frames to read-only files, and prohibits the erasure of all the image files.

Figure 9:
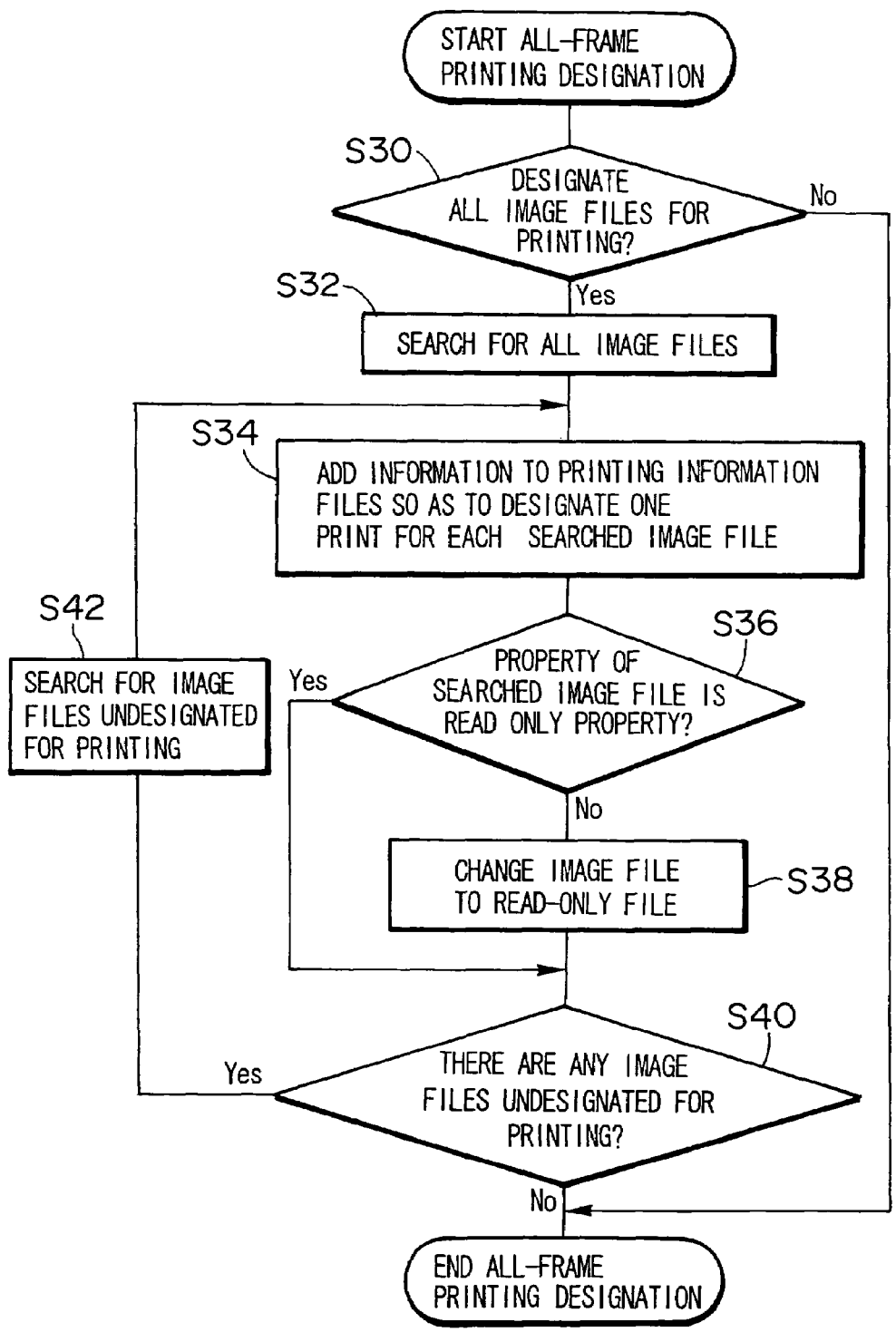
FIG. 9 is a flow chart showing the procedure in the all-frame printing designation.

FIG. 9 is a flow chart showing the above-mentioned procedure. If the "designate all frames" is selected on the menu picture in FIG. 6(A) and the all-frame printing designation is started, the CPU 66 displays the setting picture in FIG. 8(A) on the LCD monitor 28. On the setting picture, the user decides whether to designate all the frames for printing (step S30). If NO, the cancel button 44 is pressed to end the all-frame printing designation.

If YES, the execution button 46 is pressed. Therefore, the CPU 66 starts searching for the image files of all the frames recorded in the memory card 64 (step S32). A command to produce one print from each frame image in the order of the searched image files is added to the printing information file (step S34).

The CPU 66 also checks the property of the searched image files according to the property data in the management area of the memory card 64 (step S36). If the property of the image file is normal, the CPU 66 changes the image file to the read-only file (step S38). If YES, the process goes to the next step.

Then, the CPU 66 determines whether or not there are any image files of frames which are not designated for printing (step S40). If YES, the CPU 66 searches for the image files of the frames that are not designated for printing (step S42), and repeats the process from the step S34. If NO at the step S40, the CPU 66 records the produced printing information files in the memory card 64 and displays the confirmation picture in FIG. 8(B) for several seconds on the LCD monitor 28 and then displays the print menu picture in FIG. 6(A) again to end the all-frame printing designation.

Consequently, one print is designated for each of all the frames.

Figure 10:
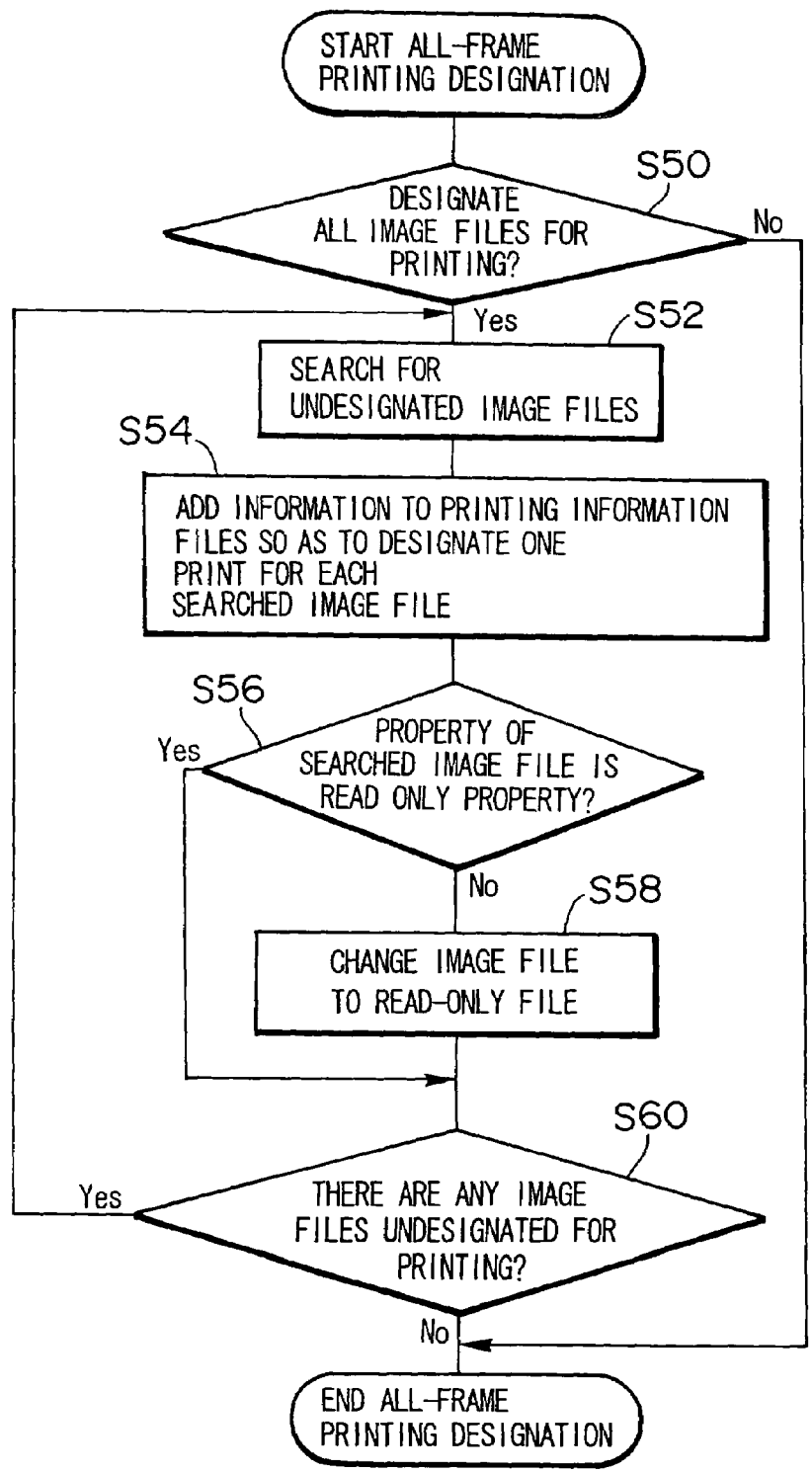
FIG. 10 is a flow chart showing a second embodiment of the procedure in the all-frame printing designation.

A description will now be given of another embodiment of the above-stated all-frame printing designation. FIG. 10 is a flow chart showing the second embodiment of the process for designating all the frames for printing. In the designation of all the frames for printing according to the second embodiment, one print is designated for each of undesignated frames. If the "designate all frames" is selected on the menu picture in FIG. 6(A) to start the all-frame printing designation, the CPU 66 displays the setting picture in FIG. 8(A) on the LCD monitor 28. On the setting picture, the user decides whether to designate all the frames for printing (step S50). If NO, the cancel button 44 is pressed to end the all-frame printing designation.

If YES, the execution button 46 is pressed. Consequently, the CPU 66 searches for image files of undesignated frames among the image files of all the frames in the memory card 64 (step S52). The CPU 66 adds a command to produce one print from each searched image file to the printing information file (step S54).

The CPU 66 checks the property of the searched image files according to the property data in the management area of the memory card 64 (step S56). If the property of the image file is normal, the CPU 66 changes the image file to a read-only file (step S58). If YES, the process goes to the next step.

Then, the CPU 66 determines whether there are any image files that are not designated for printing (step S60). If YES, the CPU 66 repeats the process from the step S52. If NO at the step S60, the CPU 66 records the produced printing information files in the memory card 64 and displays the confirmation picture in FIG. 8(B) for several seconds on the LCD monitor 28. Then, the CPU 66 displays the print menu picture in FIG. 6(A) again to end the all-frame printing designation.

Therefore, the numbers of prints are unchanged for the designated frames, and one print is designated for each of undesignated frames.

Figure 11:
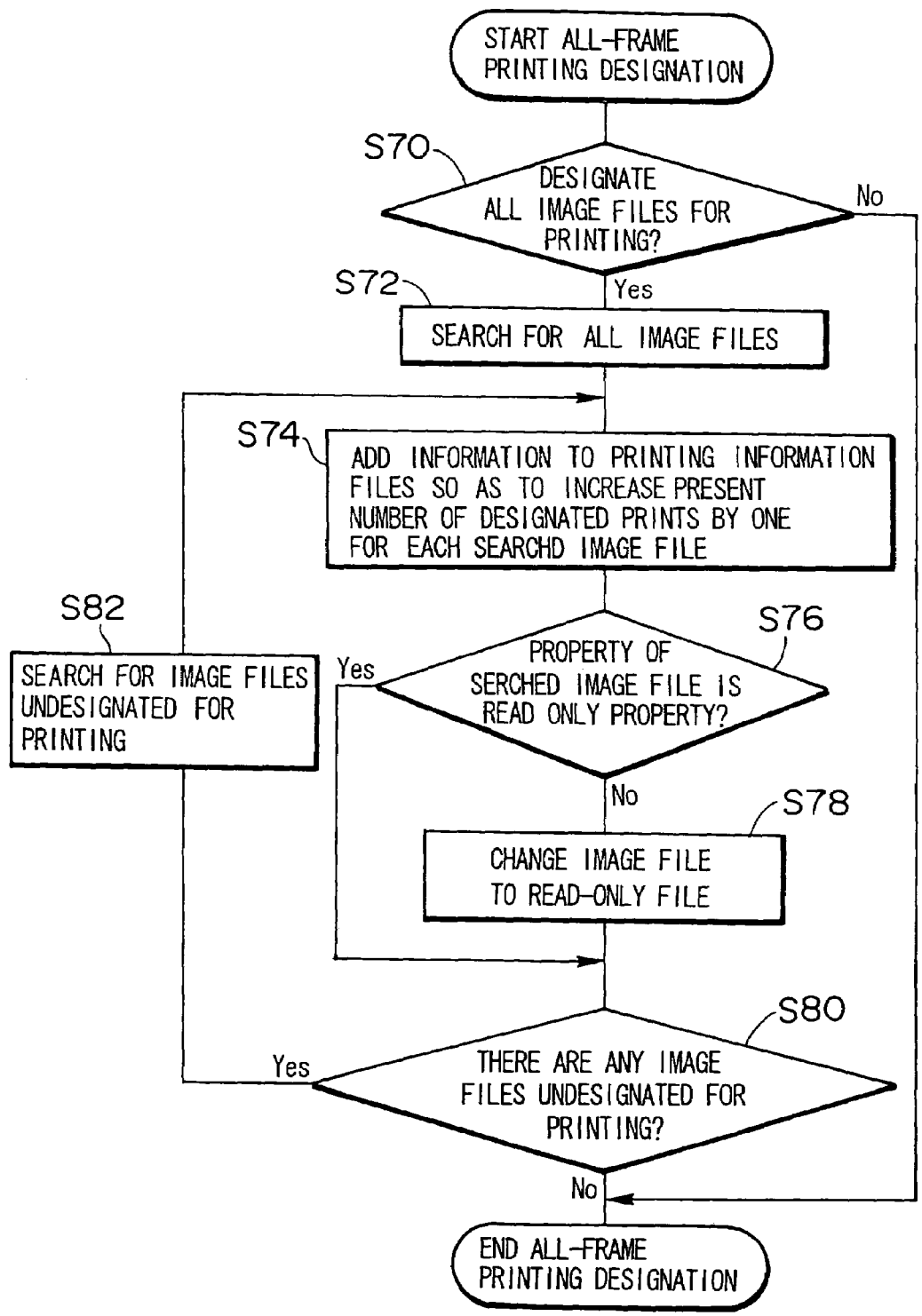
FIG. 11 is a flow chart showing a third embodiment of the procedure in the all-frame printing designation.

FIG. 11 is a flow chart showing the third embodiment of the all-frames printing designation. According to the third embodiment, the numbers of prints are increased by one for all the frames. When the "designate all frames" is selected on the menu picture in FIG. 6(A) to start the all-frame printing designation, the CPU 66 displays the setting picture in FIG. 8(A) on the LCD monitor 28. With reference to the setting picture, the user decides whether to designate all the frames for printing (step S70). If NO, the cancel button 44 is pressed to end the all-frame printing designation.

If YES, the execution button 46 is pressed. Accordingly, the CPU 66 starts searching for the image files of all the frames in the memory card 64 (step S72). The CPU 66 adds some information to the printing information file in such a manner as to increase the present number of prints by one in the order of searched image files (step S74).

The CPU 66 also checks the property of the searched image file according to the property data in the management area of the memory card 64 (step S76). If the property of the image file is normal, the image file is changed to a read-only file (step S78). If YES, the process goes to the next step.

The CPU 66 determines whether or not there are any image files of frames that are undesignated for printing (step S80). If YES, the CPU 66 searches for the image files of the frames undesignated for printing (step S82) and repeats the process from the step S74. If NO at the step S80, the CPU 66 records the produced printing information files in the memory card 64 and displays the confirmation picture in FIG. 8(B) for several seconds on the LCD monitor 28. Then, the CPU 66 displays the printing menu picture in FIG. 6(A) to finish the all-frame printing designation.

Thus, the number of prints can be increased by one for each of all the frame images collectively.

In the above method, the numbers of prints are set for all the frame images recorded in the memory card 64 collectively, but this invention should not be restricted to this. For example, a plurality of frames to be designated for printing is selected on a multiple-image picture or the like, and then, the numbers of prints are set only for the selected frames collectively.

A description will now be given of the case where the "confirm/cancel" is selected on the menu picture in FIG. 6(A). If the "confirm/cancel" is selected, a one-frame printing cancellation mode is set. In this mode, the regeneration or designation for image files of designated frames is canceled. On the LCD monitor 28, a word "OK?" is displayed over a regenerated image of a frame designated for printing in order to make sure whether to cancel the designation for the displayed image as shown in FIG. 12(A).

Operating the left or right key of the cross cursor button 32 displays another frame image designated for printing. This enables the selection of a frame, of which the designation for printing will be cancelled. It is possible to confirm the frame images designated for printing only by operating the left or right key of the cross cursor button 32.

Turning on the display button 42 displays images of frames designated for printing in a multiple-image display, and the frame image to be erased is enclosed by a bold frame on the multiple display.

The user confirms the frame images designated for printing by operating the left and right key of the cross cursor button 32 in a predetermined manner. If the frame image, for which the designation for printing is to be canceled, is displayed on the LCD monitor 28, the execution button 46 is pressed to cancel the designation for the frame image. After the execution button 46 is pressed, a confirmation picture in FIG. 12(B) is displayed for several seconds, and then, the menu display picture in FIG. 6(A) appears. If the cancel button 44 is pressed before the execution button 46 is pressed on the display picture in FIG. 12(A), the menu display picture in FIG. 6(A) appears.

If the designation for printing is canceled in the above-mentioned manner, the CPU 66 adds some information to the printing information file so that the number of prints can be 0. Then, the CPU 66 records the printing information file in the memory card 64.

A description will now be given of the case where the "cancel designation of all frames" on the menu picture in FIG. 6(A). If the "cancel designation of all frames" is selected, an all-frame printing designation cancellation mode is set. In this mode, the designation of all the frames is canceled collectively, and a word "OK?" is displayed on the LCD monitor 28 in order to make sure whether to cancel the designation of all the frames as shown in FIG. 13(A).

The user presses the execution button 46 in order to cancel the designation of all the frames. This cancels the designation of all the frames. After a confirmation picture is displayed as shown in FIG. 13(B), the menu display picture in FIG. 6(A) appears again. If the cancel button 44 is pressed before the execution button 46 is pressed, the setting becomes ineffective and the menu picture in FIG. 6(A) appears again.

If the command to print is canceled in the above-mentioned manner, the CPU 66 adds some information to the printing information files so that the numbers of prints can be 0 for all the frames. Then, the CPU 66 records the printing information files in the memory card 64.

A description will now be given of the case where an icon "protect" is selected on the regeneration menu picture in FIG. 5. If the icon "protect" is selected on the regeneration menu picture, a protect mode is set. A protect menu picture in FIG. 14(A) is displayed. In the protect mode, the image file is changed to a normal file that can be erased/changed or a read-only file that is prohibited to be erased/changed. A protected image file is set to be the read-only file, and a protection-canceled image file is set to be the normal file.

Related items such as "protect one frame", "protect all frames" and "cancel protection of all frames" are shown on the protect menu picture as shown in FIG. 14(A). Each item is selected and executed by operating the cross cursor button 32.

A description will now be given of the case where the "protect one frame" is selected. When the "protect one frame" is selected by operating the cross cursor button 32 on the protect menu picture and the execution button 46 is pressed, the protection state of the frame image regenerated on the LCD monitor 28 is changed. More specifically, the protection state of the frame image is toggled between the protected state and the unprotected state. When the execution button 46 is pressed, a confirmation picture is displayed as shown in FIG. 14(B).

The frames to be protected or unprotected can be changed by displaying a desired frame on the LCD monitor 28 by operating the left and right key of the cross cursor button 32 as is the case with the designation for printing. Thus, each frame can be-protected-or unprotected.

When the protection of a frame designated for printing in the printing information file is going to be canceled, a warning is displayed on the LCD monitor 28 in order to prohibit the cancellation of the protection. This prevents the erasure of the image file of the frame designated for printing in the printing information file to eliminates such a disadvantage that there is no image file of the frame designated for printing.

Figure 15:
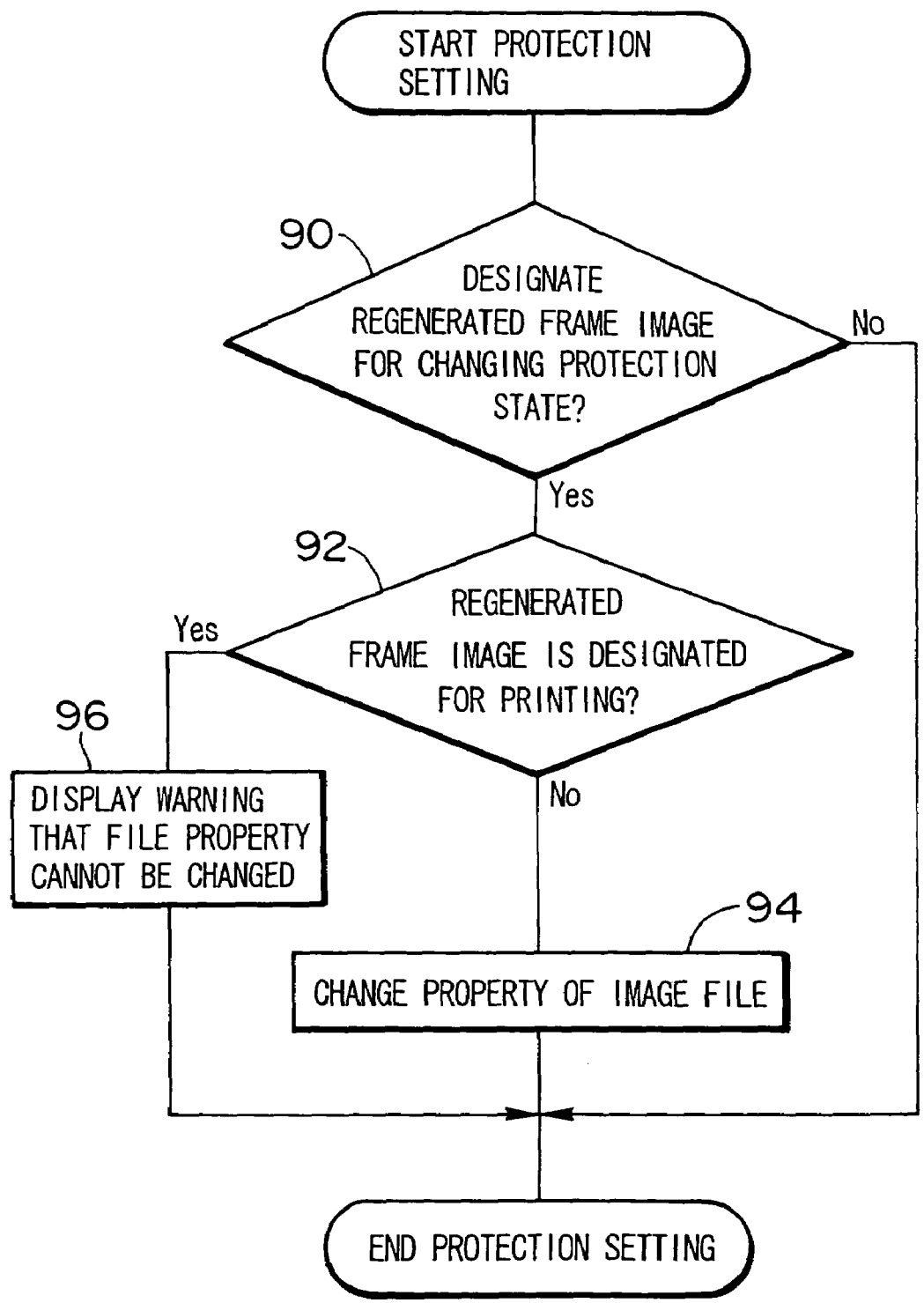
FIG. 15 is a flow chart showing the procedure for designating one frame for protection.

FIG. 15 is a flow chart showing the above procedure. With reference to the protect menu picture in FIG. 14, the user decides whether to change the protection state of the frame image currently regenerated on the LCD monitor 28 (step S90). In order to change the protection state, the "protect one frame" is selected, and the execution button 46 is pressed. If the protection state of the frame image does not need to be changed, the process is finished without pressing the execution button 46.

When the execution button 46 is pressed, the CPU 66 checks whether the frame image regenerated on the LCD monitor 28 is designated for printing or not with reference to the printing information file (step S92). If the frame image is undesignated for printing, the property of the image file thereof is changed (step S94). If the image file has the normal file property, the property thereof is changed to the read-only file property. If the image file has the read-only file property, the property thereof is changed to the normal file property.

On the other hand, if the regenerated frame image is designated for printing, a warning is displayed on the LCD monitor 28 in order to prohibit the file property thereof from changing to the normal file property (step S96).

Thereafter, the protect menu picture in FIG. 14(A) appears again.

This prohibits the protection of the image file designated for printing from being cancelled, and surely prevents the image file designated for printing from being erased carelessly.

Figure 16:
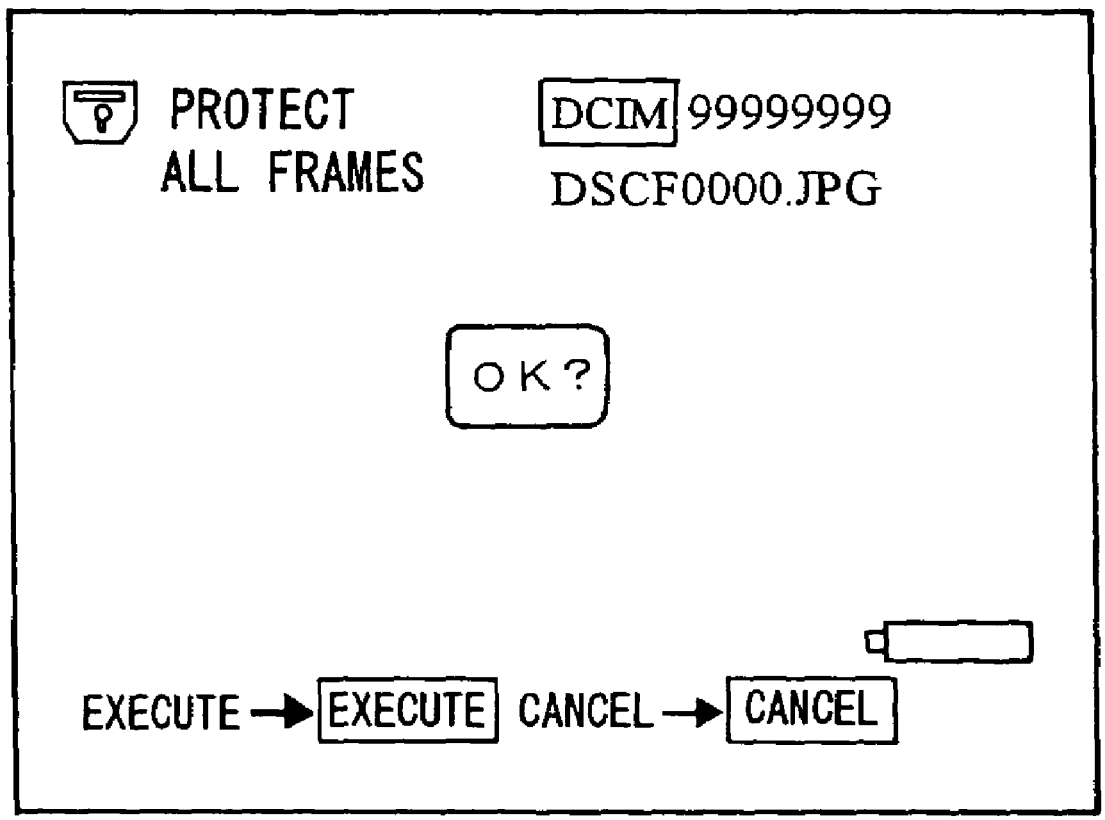
FIG. 16 is a view showing a confirmation picture for all-frame protection.

A description will now be given of the case where an item other than the "protect one frame" is selected on the protect menu picture in FIG. 14(A). If the "protect all frames" is selected and the execution button 46 is pressed, an all-frame protection confirmation picture is displayed as shown in FIG. 16. If the execution button 46 is pressed in this state, the image files of all frames are changed to the read-only files collectively, and the protect menu picture in FIG. 14(A) appears again. On the other hand, if the cancel button 44 is pressed, the protect menu picture appears again without changing the file properties.

If the "cancel protection of all frames" is selected and the execution button 46 is pressed, an all-frame cancellation confirmation picture is displayed as shown in FIG. 17. If the execution button 46 is pressed in this state, the CPU 66 checks whether there are any frame images designated for printing or not with reference to the printing information files recorded in the memory card 64. If no frame image is designated for printing, the image files of all frames are changed to the normal files, and the protect menu picture in FIG. 14(A) appears again. On the other hand, if some frame images are designated for printing, a warning is displayed on the LCD monitor 28 to prohibit the change in the file properties, and the protect menu picture in FIG. 14(A) appears again. This prevents the image file of the frame designated for printing from being erased. It is possible to cancel the protection only for the frames undesignated for printing. If the cancel button 44 is pressed on the all-frame cancellation confirmation picture in FIG. 17, the cancellation of the protection is stopped and the protect menu picture in FIG. 14(A) appears again.

As stated above, the cancellation of the protection for the image files of the frames designated for printing prevents the image files from being erased.

In this embodiment, if a frame is designated for printing and then the designation is cancelled, the image file thereof is maintained in the protected state. This invention, however, should not be restricted to this. For example, if the designation for printing is cancelled, the protection may also be cancelled at the same time. Alternatively, if the designation for printing is cancelled, the user may decide whether to cancel the protection.

In this embodiment, the image file of the frame designated for printing is automatically protected, but the image file of the protected frame may be automatically designated for printing.

In this embodiment, one print is designated for each frame image in the all-frame printing designation, but this invention should not be restricted to this. The number of prints may be determined arbitrarily.

In this embodiment, only the number of prints is set as the information in the printing information file, but this invention should not be restricted to this. It is also possible to set other information determined in the DPOF standard, such as trimming.

According to the present invention, the image file of the frame designated for printing is automatically changed to the read-only file. This prevents the image file of the frame designated for printing from being erased carelessly to eliminate such a disadvantage that there is no image file corresponding to the frame designated for printing.

Moreover, all the frames are easily designated for printing collectively, and this makes the setting for having the prints from all the frames as is the case with the prints with photographic film processing easier.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera which records an image of each frame captured by an imaging device and information of number of prints to be produced from each frame in a recording medium, said information being referred to when said image is printed, said digital camera comprising:
   an each-frame print number setting device configured to set the number of prints for each frame image recorded in said recording medium; and
   an all-frame print number setting device configured to collectively set the numbers of prints for the images of all the frames recorded in said recording medium, wherein
   when actuated, said all-frame print number setting device sets, in the recording medium, the recorded numbers of prints for the images of all the frames to one, including frames that had recorded numbers of prints previously set to zero and frames that had recorded numbers of prints previously set to one or more via said each-frame print number setting device.

2. A digital camera comprising:
   an each-frame print number setting device configured to set the number of prints for each frame image recorded in said recording medium; and
   an all-frame print number setting device configured to collectively set the numbers of prints for the images of all the frames recorded in said recording medium, wherein
   when actuated, said all-frame print number setting device sets, in the recording medium, the recorded numbers of prints for the images of frames that had recorded numbers of prints previously set to zero to one, leaving the frames that had recorded numbers of prints previously set to one or more, via said each-frame print number setting device, as currently set.

3. A digital camera comprising:
   an each-frame print number setting device configured to set the number of prints for each frame image recorded in said recording medium; and
   an all-frame print number setting device configured to collectively set the numbers of prints for the images of all the frames recorded in said recording medium, wherein
   when actuated, said all-frame print number selling device increases, in the recording medium, the recorded numbers of prints for images of all frames recorded in the recording medium by one, including frames that had recorded numbers of prints previously set to zero or more, via said each-frame print number setting device.

4. A digital camera comprising:
   an each-frame print number setting device configured to set the number of prints for each frame image recorded in said recording medium; and
   an all-frame print number setting device configured to collectively set the numbers of prints for the images of all the frames recorded in said recording medium, wherein
   when actuated, said all-frame print number setting device searches for an image file of all frames that have not been designated for printing among all the frames recorded in said recording medium, and sets the number of prints for the image of said all frames that have not been designated for printing to one.

5. The digital camera as defined in claim 1, further comprising a printing information recording device that records the information of the numbers of prints set by said all-frame print number setting device in said recording medium.

* * * * *